(12) United States Patent
Lantier

(10) Patent No.: US 7,539,522 B2
(45) Date of Patent: May 26, 2009

(54) CORDLESS WALL PHONE WITH VOLTAGE OUTLET SEPARATION

(76) Inventor: Thomas L. Lantier, 154 W. Sherman Ave., Newark, NY (US) 14513-1144

( * ) Notice: Subject to any disclaimer, the term of this patent is extended or adjusted under 35 U.S.C. 154(b) by 0 days.

(21) Appl. No.: 10/940,974

(22) Filed: Sep. 15, 2004

(65) Prior Publication Data

US 2006/0058066 A1    Mar. 16, 2006

(51) Int. Cl.
*H04B 1/08* (2006.01)
(52) U.S. Cl. .................................. 455/575.1; 455/347
(58) Field of Classification Search .................. 455/561
See application file for complete search history.

(56) References Cited

U.S. PATENT DOCUMENTS

| 5,114,365 | A |   | 5/1992  | Thompson et al. ........... 439/540 |
| 5,419,716 | A |   | 5/1995  | Sciammarella et al. ...... 439/540 |
| 5,486,650 | A |   | 1/1996  | Yetter ........................... 174/53 |
| 5,574,256 | A |   | 11/1996 | Cottone ........................ 174/53 |
| 5,621,788 | A | * | 4/1997  | Eiken ........................... 379/147 |
| 5,708,705 | A | * | 1/1998  | Yamashita et al. ........... 379/435 |
| 6,207,895 | B1 | * | 3/2001  | Engel ............................ 174/53 |
| 2002/0111197 | A1 |   | 8/2002 | Fitzgerald .................... 455/568 |
| 2003/0089710 | A1 |   | 5/2003 | Gates, II ..................... 220/3.92 |

FOREIGN PATENT DOCUMENTS

| GB | 2289381 | 4/1995 |
| JP | 7297892 | 1/1998 |

* cited by examiner

*Primary Examiner*—Lester Kincaid
*Assistant Examiner*—Shantell Heiber
(74) *Attorney, Agent, or Firm*—Richard C. Litman

(57) ABSTRACT

A cordless wall phone with voltage outlet separation provided with a base, a recessed electrical box with an interior set within the base, a mobile handset to dial outgoing phone calls, which can rest on the base for recharging, a phone jack to receive an incoming telephone line that is in the interior of the recessed electrical box and a rechargeable battery to recharge the cordless wall phone. There is also an electrical outlet set within the interior of the electrical box to receive a transformer to charge the rechargeable battery, the electrical box having a physical separation between the phone jack and the electrical outlet and a removable coverplate over the recessed electrical box to protect the interior of the recessed electrical box.

6 Claims, 3 Drawing Sheets

CORDLESS WALL PHONE WITH VOLTAGE OUTLET SEPARATION

BACKGROUND OF THE INVENTION

1. Field of the Invention

The present invention relates to a cordless wall phone. More particularly, the invention is a cordless wall phone with a physical voltage separation between an electrical receptacle and a phone jack.

2. Description of the Related Art

Development of the cordless telephone has led to less cluttered telephone usage due to the elimination of the telephone cord that connects the handset to the body of the telephone. There are other provisions that can be done to further eliminate the clutter of electrical lines and telephone lines. These other changes to the cordless telephone and regular telephones are also reflected in the related art.

United States Patent Application Publication Number 2002/0111197 published Aug. 15, 2002 by Fitzgerald, outlines the use of a cordless telephone headset and a base. Adjustment of the cordless telephone headset may be accomplished through the provision of a telephone control, and in preferred embodiments a dial pad, pivotally connected to a headband of the headset. The telephone control is configured to accommodate a plurality of user configurations and is adjustably connected to the headband to provide a range of adjustable rotation.

United States Patent Application Publication Number 2003/0089710 published on May 15, 2003 and written by Gates, II, outlines the use of an electrical box having a one-piece recessed faceplate that can be adapted to accommodate a two-piece recessed faceplate. A rear portion contains channels on the top, bottom and sides. A connecting wall attaches the rear portion to the front portion. The connecting wall extends beyond the rear portion and preferably contains one or more apertures to accommodate releasable fasteners such as screws.

U.S. Pat. No. 5,114,365 issued to Thompson et al. on May 19, 1992, outlines the use of a wall plate for use with a standard electrical outlet that includes an extended portion for mounting a modular telephone jack and the male terminal of a coaxial video cable. Integrally molded sockets projecting from a back surface of the plate are used to mount the telephone jack and video terminal. The sockets are positioned in the plate so that the plate may be inverted for locating the telephone, jack and video terminal on either side of a standard electrical box.

U.S. Pat. No. 5,419,716 issued to Sciammarella et al. on May 30, 1995, outlines the use of a power outlet and phone jack adaptor having a generally rectangular recess and a back wall upon which a power outlet and telephone jack are positioned in close proximity to one another. Indentations on the sidewalls of the recess enable the user to easily plug in or unplug an accessory, such as an electrical transformer.

U.S. Pat. No. 5,486,650 issued to Yetter on Jan. 23, 1996, outlines the use of a partition for dividing an electrical or telecommunications device box having a substantially planar dividing member with at least one retaining member extending therefrom for cooperating with a mounting post on the base member of the box to support the dividing member substantially perpendicular to the base member. The partition is removably retained in the box by the retaining member frictionally engaging the post.

U.S. Pat. No. 5,574,256 issued to Cottone on Nov. 12, 1996, outlines the use of a recessed transformer AC electrical wall outlet box for recessing modular 120 volt alternating current transformers and/or power converters within a wall-mounted electrical outlet box, while at the same time providing a standard RJ-11 modular telephone jack connection on the face plate. A first well is provided for enclosing a commonly sized modular transformer for electrical devices, such as a cordless telephone base station. A conventional AC electrical outlet is provided in the well and an aperture is provided in a wall leading into a second rear well for receiving the 120 V AC electrical wiring that is connected to the outlet.

U.S. Pat. No. 5,621,788 issued to Eiken on Apr. 15, 1997, outlines the use of a recessed wall unit to accommodate a telephone, cordless telephone and/or answering machine. The box for telephone devices has a generally rectangular box with an electrical outlet and a phone jack internally mounted within the box. The outlet is supplied electrical power by typical wiring coming into the box through an inlet.

U.S. Pat. No. 5,708,705 issued to Yamashita et al. on Jan. 13, 1998, outlines the use of an arrangement for a cordless telephone that is generally made up of a wiring implement buried in a wall and a connecting unit for connecting a communications line. The wiring implement has on the front thereof an outlet for supplying AC power and at least one modular connector for connecting a communication line. The connecting unit has a power supply plug and at least one modular jack at predetermined positions on the rear thereof.

U.S. Pat. No. 6,207,895 issued to Engel on Mar. 27, 2001, outlines the use of a device box for wall mounted communications equipment functions to provide connections for communications conductors and electrical conductors as well as a housing to receive a power transformer, with the installation of the device box for wall mounted communications equipment capable of being mounted flush with a wall surface.

Japanese Patent No. JP 7 297 892 granted to Yamashita et al. on Jan. 13, 1998, outlines the use of an arrangement for a cordless telephone that is generally made up of a wiring implement buried in a wall and a connecting unit for connecting a communications line. The wiring implement has on the front thereof an outlet for supplying AC power and at least one modular connector for connecting a communication line. The connecting unit has a power supply plug and at least one modular jack at predetermined positions on the rear thereof.

Great Britain Pat. No. 2,289,381 granted to Yamashita et al. on Apr. 27, 1995, outlines the use of a flush wall-mount outlet box with a mains outlet socket, a telecommunications outlet socket and an affixing for receiving a cordless telephone base unit. The base unit includes a mains plug, a telecommunications plug and a hook for attaching to the wall box.

Although each of these patents outlines the use of novel and useful devices involving telephones, what is really needed is a way to physically separate electrical outlets and telephone outlets from each other. This is required per the National Electric Code due to the difference in voltage between the 12V telephone line and the 110V electrical outlet and is currently not addressed in any invention or product in the related art.

None of the above inventions and patents, taken either singly or in combination, is seen to describe the instant invention as claimed. Thus a cordless wall phone with voltage outlet separation solving the aforementioned problems is desired.

SUMMARY OF THE INVENTION

The invention is a cordless wall phone with voltage outlet separation provided with a base, a recessed electrical box with an interior set within the base, a mobile handset to dial outgoing phone calls, which can rest on the base for recharging, a phone jack to receive an incoming telephone line that is in the interior of the recessed electrical box and a transformer within the base to recharge the cordless wall phone. There is also an electrical outlet set within the interior of the electrical box to receive the transformer to charge the rechargeable battery, the electrical box having a physical separation between the phone jack and the electrical outlet and a removable cover-plate over the recessed electrical box to protect the interior of the recessed electrical box.

Accordingly, it is a principal object of the invention to provide a cordless wall phone that can hide electrical outlet lines and telephone lines involved with the cordless wall phone.

It is another object of the invention to provide a physical separation between the telephone line and any electrical outlets per the National Electric Code.

It is a further object of the invention to remove any clutter involving electrical lines or telephone lines when using a cordless telephone.

Still another object of the invention is to provide a cordless telephone that has a built-in recessed electrical box that has a hidden phone jack and a hidden electrical outlet that is designed to be easily installable against a wall surface.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
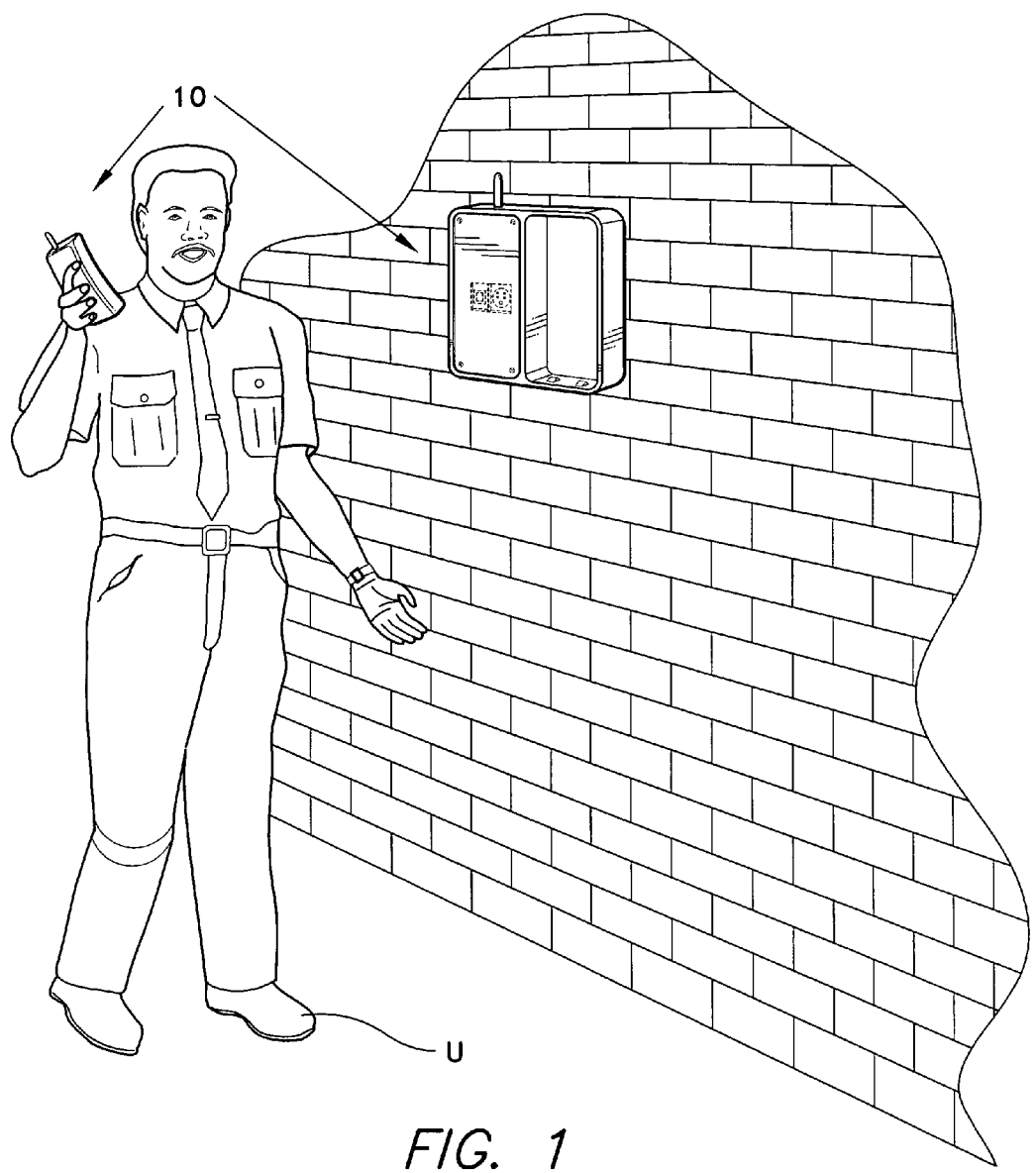
FIG. 1 is an environmental, perspective view of a cordless wall phone with voltage outlet separation according to the present invention.

The present invention is a cordless wall phone with voltage outlet separation 10, as is depicted in FIG. 1. The cordless wall phone with voltage outlet separation 10 can be utilized by any user U, as is shown in FIG. 1.

Figure 2:
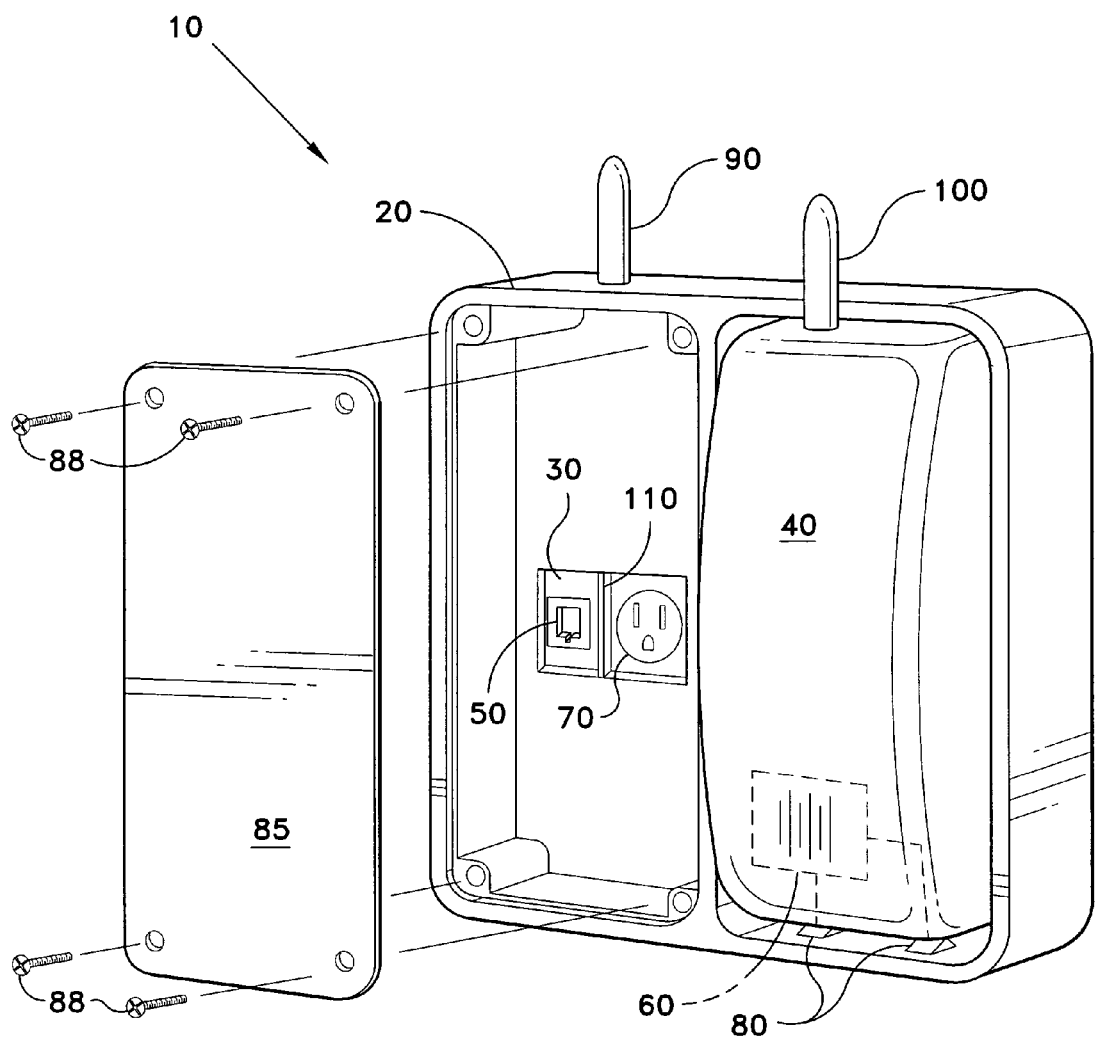
FIG. 2 is a front perspective view of the cordless wall phone with voltage outlet separation without a cover.

As is shown in FIG. 2, the cordless wall phone with voltage outlet separation 10 comprises a base 20, a recessed electrical box 30 with an interior set within the base 20, a mobile handset 40 to dial outgoing phone calls, which can rest on the base 20 for recharging, a phone jack 50 to receive an incoming telephone line (not shown) that is in the interior of the recessed electrical box 30 and a rechargeable battery 60 set within the mobile handset 40 to recharge the cordless wall phone with voltage outlet separation 10.

The cordless wall phone with voltage outlet separation 10 further comprises an electrical outlet 70 set within the interior of the recessed electrical box 30 to receive a transformer (not shown) to charge the rechargeable battery 60. The recessed electrical box 30 has a physical separation between the phone jack 50 and the electrical outlet 70 and a removable cover-plate (FIG. 3, 85) over the recessed electrical box 30 to protect the interior of the recessed electrical box 30.

The cordless wall phone with voltage outlet separation 10 further comprises a pair of charging contacts 80 to charge the mobile handset 40 through the contacts 80, an antennae on the base 90 to communicate with the mobile handset 40 and an antenna on the mobile handset 100 to communicate with the antenna on the base 90. There is also a nonconductive wall 110 set between the phone jack 50 and the electrical outlet 70, as required per the National Electric Code, to separate the high voltage electrical outlet 70 and the low voltage phone jack 50. As is shown in FIG. 2, the nonconductive wall 110, is located between recessed phone jack 50 and recessed electrical outlet 70.

Figure 3:
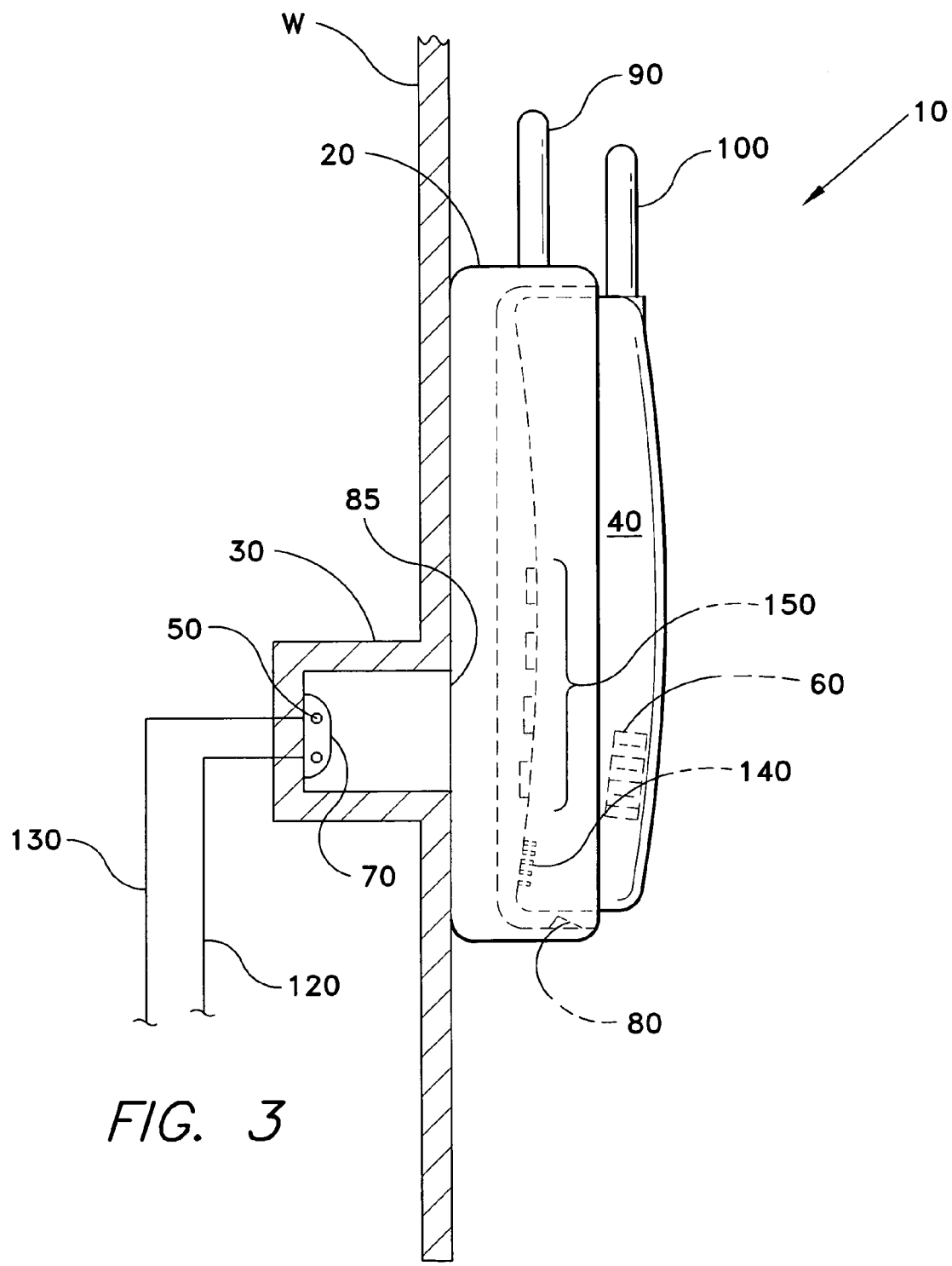
FIG. 3 is a side perspective view of the cordless wall phone with voltage outlet separation.

As depicted in FIG. 3, the cordless wall phone with voltage outlet separation 10 is installed within a user's U wall W when being used. Specifically, the recessed electrical box 30 is inserted into the wall W with the base 20 of the cordless wall phone with voltage outlet separation 10 being flush against the wall W. Wiring for the phone jack 120 and wiring for the electrical outlet 130 are set safely behind the recessed electrical box 30, which is another advantage that the cordless wall phone with voltage outlet separation 10 has over the related art. Like all cordless phones, the cordless wall phone with voltage outlet separation 10 also has a mouthpiece 140 and a plurality of touchtone numerical buttons and symbols 150.

The cordless wall phone with voltage outlet separation 10, also can have an isolated and insulated ground (not shown) provided to reduce harmonic interference with fluorescent lighting loads between the antenna on the base 90 and the antenna on the mobile handset 100. The removable cover-plate 85 is secured with screws 88 and can be removed to expose the phone jack 50 and the electrical outlet 70, which are set in the back of the recessed electrical box 30. As described earlier, the physical separation between the phone jack 50 and the electrical outlet 70 is a nonconductive wall 110, which is a point of novelty in the related art.

Use of the cordless wall phone with voltage outlet separation 10 is straightforward. A transformer (not shown) is plugged into the electrical outlet 70 to charge the rechargeable battery 60 in the handset 40 as needed. The recessed electrical box 30 replaces any regular electrical box that would ordinarily be used. The cordless wall phone with voltage outlet separation 10 is approximately 8" wide and 7.5" lengthwise and the recessed electrical box 30 is recessed 2.5"-3.5". The base 20 and mobile handset 40 are made of durable plastic and the removable cover-plate 85 is a 2-gang cover.

It is to be understood that the present invention is not limited to the embodiment described above, but encompasses any and all embodiments within the scope of the following claims.

I claim:

1. A cordless wall phone, comprising:
    a base defining a rear wall;
    a recessed electrical box with an interior set within the base, a front edge of said recessed electrical box being joined to the rear wall of said base, said recessed electrical box projecting rearwardly from the rear wall;
    a mobile handset to dial outgoing phone calls, which can rest on the base for recharging;
    a phone jack that is received in the interior of the recessed electrical box, said phone jack being recessed in the rear wall of the base, such that a front face of the phone jack is positioned to the rear of the rear wall;
    a rechargeable battery set within the mobile handset;
    an electrical outlet set within the interior of the electrical box, said electrical outlet being recessed in the rear wall of the base, such that a front face of the electrical outlet is positioned to the rear of the rear wall, the electrical outlet being located adjacent to and positioned in the same orientation as the phone jack;

a transformer that is received by the electrical outlet to charge the rechargeable battery;

a physical separation in the recessed electrical box between the phone jack and the electrical outlet, the physical separation between the phone jack and the electrical outlet being a nonconductive wall, the nonconductive wall extending from the recessed front faces of said phone jack and said electrical outlet, forward to the rear wall of said base;

a removable cover-plate over the recessed electrical box to protect the interior of the recessed electrical box;

a pair of charging contacts to charge the mobile handset from the rechargeable battery;

an antenna on the base to communicate with the mobile handset; and an antenna on the mobile handset to communicate with the antenna on the base.

2. The cordless wall phone according to claim 1, wherein the recessed electrical box is installed and inserted within a user's wall.

3. The cordless wall phone according to claim 1, wherein a ground is provided.

4. The cordless wall phone according to claim 3, wherein an isolated and insulated ground can be provided to reduce harmonic interference between the antenna on the base and the antenna on the mobile handset.

5. The cordless wall phone according to claim 1, wherein the removable cover-plate can be removed to expose the phone jack and the electrical outlet.

6. The cordless phone according to claim 1, wherein the wiring for the phone jack and the wiring for the electrical outlet are set behind the recessed electrical box.

* * * * *